United States Patent
Hong (10) Patent No.: US 10,507,392 B2
(45) Date of Patent: Dec. 17, 2019

(54) METHOD FOR DETERMINING CHEATING IN DART GAME, DEVICE AND SERVER

(71) Applicant: HONG INTERNATIONAL CORP., Seoul (KR)

(72) Inventor: Sang Uk Hong, Seoul (KR)

(73) Assignee: PHOENIXDARTS CO., LTD., Seoul (KR)

( * ) Notice: Subject to any disclaimer, the term of this patent is extended or adjusted under 35 U.S.C. 154(b) by 0 days.

(21) Appl. No.: 15/557,262

(22) PCT Filed: Feb. 25, 2016

(86) PCT No.: PCT/KR2016/001826
§ 371 (c)(1),
(2) Date: Sep. 11, 2017

(87) PCT Pub. No.: WO2016/144022
PCT Pub. Date: Sep. 15, 2016

(65) Prior Publication Data
US 2018/0056193 A1 Mar. 1, 2018

(30) Foreign Application Priority Data
Mar. 10, 2015 (KR) .................... 10-2015-0033036

(51) Int. Cl.
*A63F 13/00* (2014.01)
*A63F 13/75* (2014.01)
(Continued)

(52) U.S. Cl.
CPC ............ *A63F 13/75* (2014.09); *A63F 9/0278* (2013.01); *A63F 13/428* (2014.09); *A63F 13/798* (2014.09); *F41J 3/00* (2013.01)

(58) Field of Classification Search
CPC .............................. A63F 13/75; A63F 9/0278
See application file for complete search history.

(56) References Cited

U.S. PATENT DOCUMENTS 7,361,083 B2 * 4/2008 Valero Moreno ....... G07F 17/32
273/371
2005/0075153 A1 4/2005 Moreno
(Continued)

FOREIGN PATENT DOCUMENTS

KR 10-2010-0034645 A 5/2011
KR 10-1032361 B1 5/2011
(Continued)

OTHER PUBLICATIONS

Japan Patent Office, Office Action for Japanese Patent Application 2017-547117, dated Jul. 31, 2018.
(Continued)

*Primary Examiner* — David L Lewis
*Assistant Examiner* — Eric M Thomas
(74) *Attorney, Agent, or Firm* — Umberg Zipser LLP (57) ABSTRACT

According to one embodiment of the present invention for implementing the objective above, a method for determining cheating in a dart game is disclosed. The method for determining cheating in a dart game may include: collecting game data and multimedia information of a player from a dart game device; transmitting the collected game data and multimedia information to a client device; receiving, from the client device, feedback information related to legitimacy of play with respect to the multimedia information; and processing the game data of the player corresponding to the multimedia information, on the basis of the received feedback information related to legitimacy of play.

15 Claims, 7 Drawing Sheets

(51) Int. Cl.
   *A63F 13/428* (2014.01)
   *A63F 13/798* (2014.01)
   *A63F 9/02* (2006.01)
   *F41J 3/00* (2006.01)

(56) References Cited

U.S. PATENT DOCUMENTS

| | | |
|---|---|---|
| 2012/0242043 A1 | 9/2012 | Hong |
| 2015/0038048 A1* | 2/2015 | Rosenberg ............ F41A 33/00 446/429 |
| 2015/0308793 A1 | 10/2015 | Hong |
| 2015/0336011 A1 | 11/2015 | Hong |

FOREIGN PATENT DOCUMENTS

| | | |
|---|---|---|
| KR | 10-2011-0125459 A | 2/2013 |
| KR | 10-2014-0060127 A | 5/2014 |
| KR | 10-2014-0112124 A | 9/2014 |
| WO | 2014073827 A1 | 5/2014 |

OTHER PUBLICATIONS

European Patent Office, Search Report for European Patent Application 16761909.7, dated Aug. 21, 2018.

* cited by examiner

METHOD FOR DETERMINING CHEATING IN DART GAME, DEVICE AND SERVER

TECHNICAL FIELD

The present invention relates to a dart game method, and more particularly, to a method for determining cheating in a dart game which is in progress on-line.

BACKGROUND ART

In general, a dart refers to a 'small arrow' and is a game that makes marks by throwing an arrow-shaped dart pin to a centrifugal target marked with figures. The dart game has an advantage in that anybody can enjoy the dart game anytime and anywhere if there are only an arrow-headed dart and the dart target. In recent years, as various game methods have been developed and a scoring method has been organized, the dart game has been developed as worldwide leisure, and therefore, men and women of all ages have conveniently enjoyed the dart game.

In keeping with the popularity of the dart game, contests are often held in which a large number of players participate, rather than simply enjoying the dart game. Until recently, the dart game contests were mostly held off-line.

In recent years, the number of players who enjoy the dart game by on-line connection has also gradually increased. The on-line dart game contest is in progress with the trend, but since the online contest is held only at a designated place, differentiated advantages from the offline dart game contest are not significantly highlighted. One of the reasons why the dart game contest is in progress only at the designated place is to monitor players who try to cheat.

A cheating preventing measure up to now when the dart game content is in progress is taken by a method in which a referee who is delegated by World Dart Federation (WDF) and Korea Darts Federation (KDF) to directly be responsible for operating a game monitors the cheating in the vicinity of a dart board, and as a result, inconvenience of spatial constraint is caused to the players.

Korean Patent Application No. 2010-0034645 presents an illegal throwing sensing apparatus and method in a dart game and presents only a foul sensing apparatus that determines whether a dart pin hits and whether a player crosses a throwing line.

Therefore, as described above, when the online dart game contents is in progress, there is a need in the art to provide a new method for monitoring cheating so that the online dart game contest is in progress at a predetermined place where a dart game device is installed.

DISCLOSURE

Technical Problem

The present invention has been made in an effort to provide a method in which dart game players may participate in a dart game contest without a spatial constraint.

The present invention has been made in an effort to provide a method for determining cheating in a dart game using on-line in conducting a dart game contest.

Technical Solution

Disclosed is a method for determining cheating in a dart game according to an embodiment of the present invention for implementing the aforementioned objects. The method for determining cheating in a dart game may include: collecting game data and multimedia information of a player from a dart game device; transmitting the collected game data and multimedia information to a client device; receiving from the client device, feedback information related to legitimacy of play with respect to the multimedia information; and processing the game data of the player corresponding to the multimedia information, on the basis of the received feedback information related to legitimacy of play.

According to another embodiment of the present invention, disclosed is a server providing game data collected from one or more dart game devices. The server providing game data may include: a network communication unit collecting game data and multimedia information of a player from a dart game device, transmitting the collected game data and multimedia information to a client device, and receiving feedback information on legitimacy of play with respect to the game data and the multimedia information from the client device; and a control unit processing the game data of the player corresponding to the multimedia information on the basis of the received feedback information related to legitimacy of play.

According to yet another embodiment of the present invention, disclosed is a client device. The client device may include: a user input module receiving an input of feedback information related to legitimacy of play of a user according to game data and multimedia information of a player; a display module displaying a game result confirmation page including a request icon for requesting the player information, the game data of the player, and multimedia information related with the game data of the player; and a network communication module transmitting the input feedback information related to legitimacy of play to a server.

Advantageous Effects

According to an embodiment of the present invention, a method can be provided, in which dart game players may participate in a dart game contest without a spatial constraint.

According to an embodiment of the present invention, a method for determining cheating in a dart game using on-line in conducting a dart game contest can be provided.

DESCRIPTION OF DRAWINGS

Some of embodiments are illustrated in the accompanying drawings so as to appreciate features of the mentioned disclosed contents with reference to the following embodiments through detailed and more concrete description. Further, it is intended that like reference numerals in the drawing denote the same or similar function throughout several aspects. However, the accompanying drawings just illustrate only specific typical embodiments of the disclosed contents and are not considered to limit the scope of the present invention and it should be noted that other embodiments having the same effect can be sufficiently recognized.

BEST MODE

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art will also recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof.

Further, various aspects and features will be presented by a system which can include multiple devices, components, and/or modules. It should also be appreciated and recognized that various systems can include additional apparatuses, components, and/or modules and/or that the various systems cannot include all of apparatuses, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of the hardware and software, and the software.

Moreover, the term "or" is intended to mean not exclusive "or" but inclusive "or". That is, when not separately specified or not clear in terms of a context, a sentence "X uses A or B" is intended to mean one of natural inclusive substitutions. That is, "X uses A or B" may be applied to all of the case where X uses A, the case where X uses B, and the case where X uses both A and B. Further, it should be understood that the term "and/or" used in the specification designates and includes all available combinations of one or more items among enumerated related items.

In addition, the word "comprises" and/or "comprising" means that the corresponding feature and/or component is present, but it should be appreciated that presence or addition of one or more other features, components, and/or a group thereof is not excluded. Further, when not separately specified or not clear in terms of the context that a singular form is indicated, it should be construed that a singular form generally means "one or more" in the present specification and the claims.

Further, the terms "information" and "data" used in the specification may also be often used to be exchanged with each other. Further, the terms "client", "user", and "player" used in the specification may also be often used to be exchanged with each other.

Figure 1:
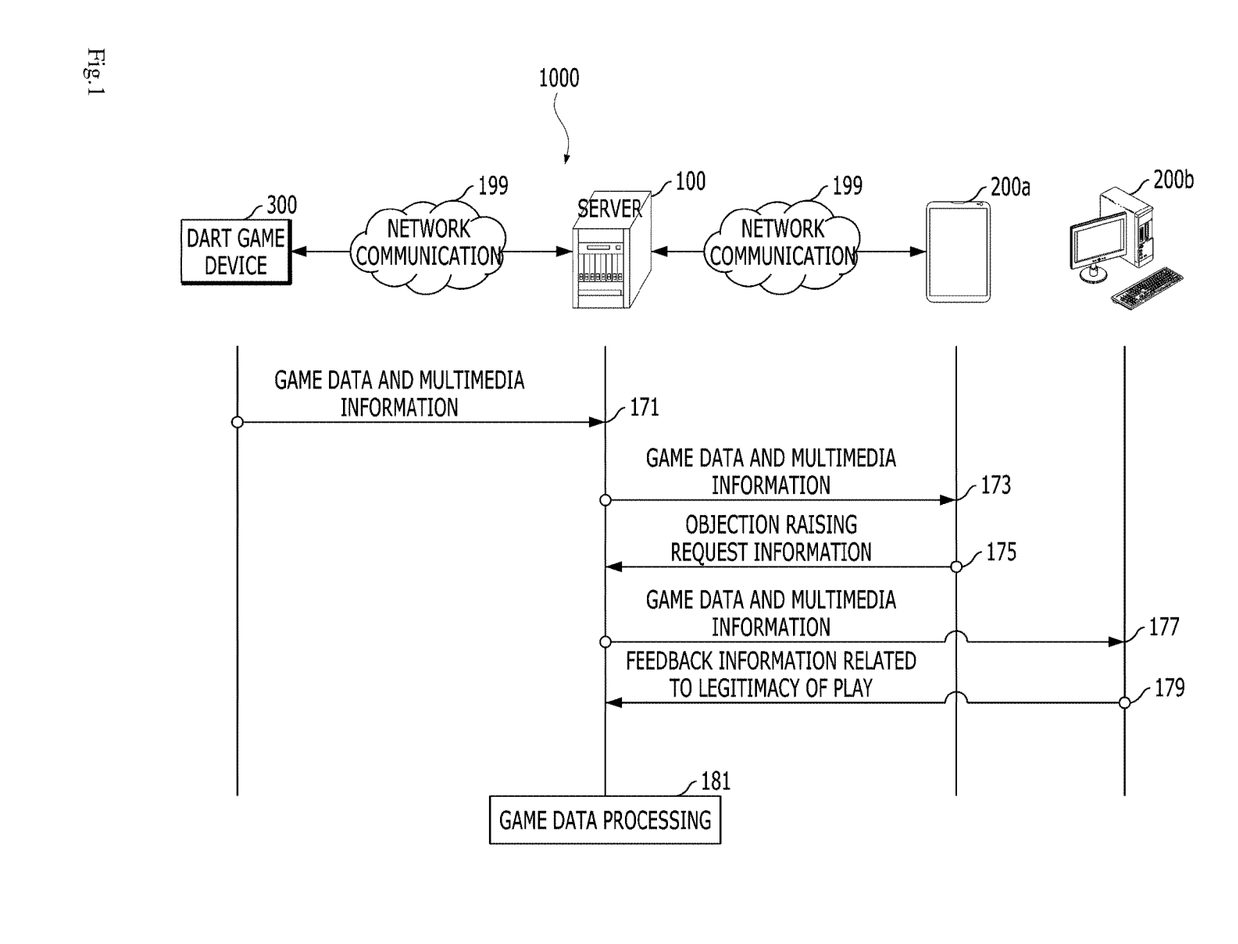
FIG. 1 is a conceptual view of a game network including a game data providing server and a client device according to an embodiment of the present invention.

FIG. 1 is a conceptual view of a game network including a game data providing server and a client device according to an embodiment of the present invention.

According to an aspect of the present invention, as illustrated in FIG. 1, the system 1000 may be constituted by a game data providing server 100, client devices 200a and 200b, a dart game device 300, and a network 199.

Components constituting the system 1000 illustrated in FIG. 1 are exemplary and only some of the components may constitute the system 1000 or an additional component(s) may be included in the system 1000 in addition to the components. For example, the game data providing server 100 may include an enterprise application integration (EAI) server, a result data receiving server of an external search engine, a dart game operating server, and/or a call center server.

In an aspect of the present invention, the game data providing server 100 and the client device 200 may transmit and receive various information through the network 199.

The game data providing server 100 may perform communication with the client device 200 and the dart game device 300, collection of data game data, collection of result data of the external search engine, storage of dart game player information, game data, ranking information, rank information, and feedback information, generation, distribution, and storage of a terminal application, and the like.

The various information may mean, for example, personal information including player identification information, feedback information regarding a score of a game, an overall ranking, a level, maximum combo information, maximum successive victory information, lowest score information, a dart pin trajectory, a dart pin throwing operation, proximity of dart pins which hit, delay time and play legitimacy (e.g., objection raising request information, a determination result based on a request for objection raising, penalty information to be imposed on a cheating player, etc.).

The aforementioned information may be input through the client device 200 or input by the dart game device 300. The aforementioned information may be stored in a database or a computer-readable storage medium of the game data providing server 100. According to an aspect of the present invention, the computer-readable storage medium may be included in the client device 200.

The storage medium may include all kinds of storage media storing programs and data so as to be readable by a computer system. According to an aspect of the present invention, the media may include a read only memory (ROM), a random access memory (RAM), a compact disk (CD)-ROM, a digital video disk (DVD)-ROM, a magnetic tape, a floppy disk, an optical data storage device, and the like and also include a medium implemented in the form of a carrier wave (for example, transmission through the Internet). Additionally, the media are distributed to systems connected through the network 199 to store computer readable codes and/or commands in a distribution scheme.

According to an embodiment of the present invention, the client device 200 may be referred to as user equipment, mobile, a PC which may communicate wirelessly, a portable phone, a kiosk, a cellular phone, a cellular, a cellular terminal, a subscriber unit, a subscriber station, a mobile station, a terminal, a remote station, a PDA, a remote terminal, an access terminal, a user agent, a portable device having a wireless connection function, a predetermined device which may use a wireless connection mechanism, such as a wireless modem, and the like, but is not limited thereto.

Further, the client device 200 may be referred to as a predetermined device capable of using a wired connection mechanism, such as a wired facsimile, a PC including a wired modem, a wired telephone, a terminal which may communicate by a wired type, or the like, but is not limited thereto.

In an additional aspect of the present invention, the client device 200 may also be used by a dart game player or a referee. In this case, the client device 200 may be referred to as a player terminal and also referred to as a referee terminal, and the like. Further, the player terminal may be referred to as a first client device 200*a* and the referee terminal may be referred to as a second client device 200*b*.

The second client device 200*b* may include devices which may use the wireless connection mechanism or the wired connection mechanisms. Additionally, an additional terminal by another use subject (e.g., employees of an enterprise other than a dart game enterprise, etc.) other than the aforementioned use subject may also be included in the second client device 200*b*. Further, the second client device 200*b* may mean terminals which may be used by persons (e.g., game company employees, etc.) related with a game company such as a dart game company. That is, according to an aspect of the present invention, a specific terminal which has relevancy with the game company may be referred to as the second client device 200*b*.

In an embodiment of the present invention, when specific applications distributed by the dart game company are installed and executed in the client device 200, the game data providing server 100 may communicate with the first client device 200*a* and/or the second client device 200*b* through the network 199 so that the dart game player, the referee, and the dart game company employee enjoy various corresponding services.

In an aspect of the present invention, the game data providing server 100 may provide different services to the client devices 200 by various use subjects, respectively. That is, each of the first client device 200*a* used by the player and the second client device 200*b* used by the dart game company employee may be permitted to access or restricted from accessing a specific server among a plurality of dart game company servers according to a policy of the game company and/or user configuration. Alternatively, the first client device 200*a* may be permitted to access or restricted from accessing specific data of the game data providing server 100 according to the policy of the dart game company and/or user configuration.

Further, the first client device 200*a* and/or the second client device 200*b* may have different input and output screens according to the policy of the dart game company and/or configuration. Additionally, the first client device 200*a* may be configured to access only the player information, the game data, the object 제기 request information, the feedback information regarding the play legitimacy, and limited data such as the ranking and the level.

Furthermore, the second client device 200*b* used by the referee and the dart game company employee may primarily confirm the aforementioned information and may be configured to access data required for performing businesses such as an objection raising examination. Moreover, the client device 200 may perform operations performed by the game data providing server 100.

In addition, the network 199 may form a channel for data communication between the game data providing server 100 and the client device 200.

"System" and "network" which are terms used in the present specification may often be used to be replaced with each other.

The network 199 presented herein may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

Further, the network 199 presented herein may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

The techniques described in the present specification may also be used in other networks in addition to the aforementioned networks.

The network 199 according to an aspect of the present invention may be configured regardless of communication modes such as wired and wireless modes and constituted by various communication networks including a personal area network (PAN), a wide area network (WAN), and the like. Further, the network 199 may be the known World Wide Web (WWW) and may adopt a wireless transmission technology used for short-distance communication, such as infrared data association (IrDA) or Bluetooth.

As illustrated in FIG. 1, according to an embodiment of the present invention, the game data providing server 100 may collect the game data of the player and the multimedia information from the dart game device 300 through the network 199 (171). Further, the game data providing server 100 may collect information including information other than the game data and the multimedia information. For example, the game data providing server 100 may also collect information such as dart game contest information, tournament information, and league information.

According to an embodiment of the present invention, the game data providing server 100 may transmit the collected game data and multimedia information to the first client device 200*a* (173). Further, the game data providing server 100 may transmit the data and information to the second client device 200*b* and may transmit the data and the information to any other device. Additionally, the player can primarily determine whether cheating occurs after checking the game data and multimedia information received by the first client device 200*a*. Further, the game data and the multimedia information may be provided only to the corresponding player and an opponent player who play the dart game. When the dart game contest is in progress, the game data providing server 100 may provide the game data and the multimedia information so that all players check the game data and the multimedia information.

According to an embodiment of the present invention, the feedback information regarding play legitimacy for the multimedia information may be received from the first client device 200*a* (175). The feedback information on the play legitimacy described herein may include the objection raising request information and/or the determination result information, and the objection raising request information may be received from the first client device 200*a*. That is, the player confirms the game data and the multimedia information received by the first client device 200*a* and determines whether the cheating occurs and based on the determination, the player may transmit the objection raising request information to the game data providing server 100 through the first client device 200*b*.

Additionally, the game data providing server 100 may transmit the game data and the multimedia data corresponding to the objection raising request information to the second client device (177). Further, when the game data providing server 100 transmits the game data and the multimedia information to the second client device 200*b* in step 173, the game data providing server 100 provides notification information about the object request to allow the referee to determine whether the cheating occurs by confirming the game data and the multimedia information.

According to an aspect of the present invention, the game data providing server 100 may receive the determination result information for the game data and the multimedia information to the second client device (179). Herein, the referee may transmit various information (e.g., a dart game rule, a reason for determination, etc.) included in the determination result information to the game data providing server 100 through the second client device 200*b* (see FIG. 4*c*).

According to an embodiment of the present invention, the game data providing server 100 may process the game data of the player corresponding to the multimedia information based on the feedback information (e.g., determination result information) about the received play legitimacy (181). A method of processing the game data of the game data providing server 100 may include determining whether the player is cheating based on the feedback information on the received play legitimacy. Additionally, the method of processing the game data may include determining information of the penalty to be imposed on the player determined to be cheating. Here, in the method of determining the penalty information, the referee may make a decision to impose a penalty directly, and the game data providing server 100 may perform only processing for the decision to impose the penalty. For example, the referee makes a decision to impose the penalty (e.g., disciplinary such as prohibition of participation, downgrading of ranking, dismissal of a dart contest, disqualification of a prize, etc.) and the game data providing server 100 may perform only the processing thereof (see FIG. 4*c*).

Additionally, the game data providing server 100 may receive the determination result information on the game data and the multimedia information from the second client device to make a decision on the penalty to be imposed. For example, the game data providing server 100 may determine whether to impose the penalty by identifying the determination result information (e.g., violation of the game rule Clause 00, Article 00, the number of times of violation, etc.) prepared by the referee (see FIG. 4*c*).

In the method of processing the game data of the player according to an embodiment of the present invention, the game data and the multimedia information of the player corresponding to the feedback information on the received play legitimacy may be marked so as to be distinguished from the game data and multimedia information of another player. The marking described herein may mean inserting a specific mark into the information of the player corresponding to the feedback information about the play legitimacy in the player list. For example, the game data providing server 100 may display and mark figures, characters, and colors on player information corresponding to the feedback information on the play legitimacy. In addition, the game data providing server 100 may mark the player information by mixing the above-mentioned figures, characters, and colors. Additionally, the game data providing server 100 may change the color of a list of the player (e.g., player 3) that is marked in the player information and mark the player information by underlining. Further, the game data providing server 100 may highlight and mark the information of the player corresponding to the feedback information on the play legitimacy. In addition, various marking methods other than the above-described marking method may be used.

Additionally, the game data providing server 100 may set various marking methods based on the number of cheatings of the player. For example, the game data providing server 100 may change the brightness and saturation of the color representing the player information as the number of cheatings of the player increases. Further, the game data providing server 100 may mark the information of the player with figures which are applied in stages, as the number of cheatings of the player increases. Furthermore, the game data providing server 100 may apply any other marking method to the player information whose number of cheatings increases.

Figure 2:
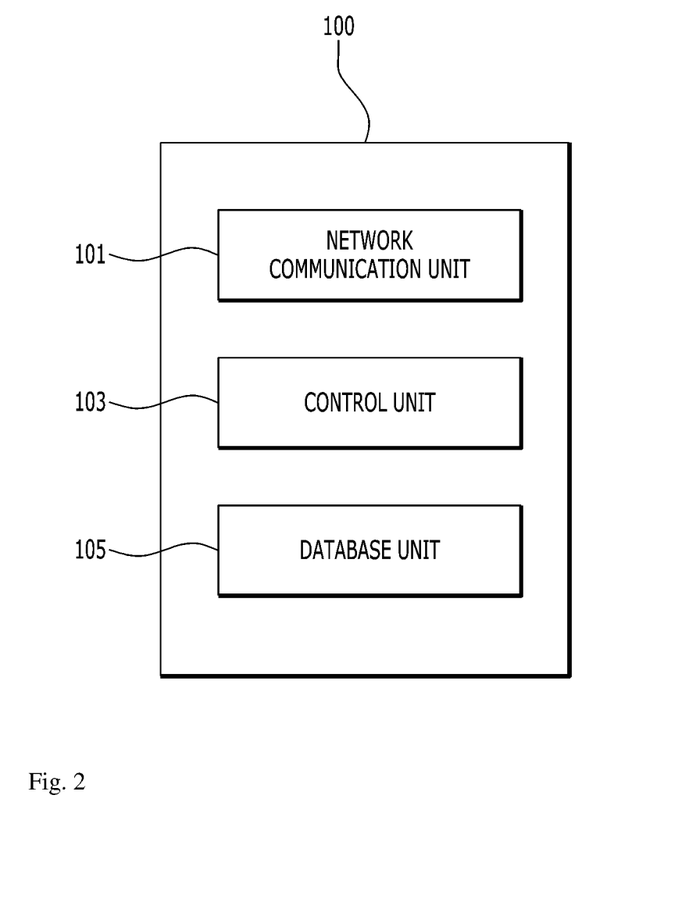
FIG. 2 illustrates components of the game data providing server according to the embodiment of the present invention.

FIG. 2 illustrates components of the game data providing server according to the embodiment of the present invention.

The game data providing server 100 according to an aspect of the present invention may include a dart server, a result data receiving server of an external search engine, a speech to text (STT) server, and a combination thereof.

In an aspect of the present invention, the game data providing server 100 may include the STT server and the STT server may include a predetermined type software or hardware system that may recognize a human voice conversation and convert the recognized voice conversation into text data, such as an STT converter, an STT converting machine, an STT converting engine, etc. This STT server may be replaced with a network communication unit 101, replaced with a control unit 103, or replaced with a database unit 105. Furthermore, the STT server may be included in the game data providing server 100 or may exist independently as an external server.

According to an aspect of the present invention, the game data providing server 100 may include the network communication unit 101, the control unit 103, and the database unit 105.

The components constituting the game data providing server 100 of FIG. 2 are exemplary and only some of the components may constitute the game data providing server 100 or an additional component(s) other than the components may be included in the game data providing server 100.

According to an embodiment of the present invention, the network communication unit 101 may include a receiving unit and a transmitting unit. Additionally, the network communication unit 101 may collect and/or receive the dart game data from the dart game apparatus via the network 199. In addition, the network communication unit 101 may receive an access request message and/or a request message for various information from the client device 200.

In an aspect of the present invention, the network communication unit 101 may receive the dart game data in real time. For example, the network communication unit 101 may receive the dart game data in real time when one dart game ends. In this case, the dart game data may be stored in the database unit 105 by the control unit 103. Therefore, the received dart game data may be evaluated, updated, and/or eliminated in real time. Additionally, the receiving unit may receive information requested by the client device 200. The information described herein means information including the information on the objection raising request information and the feedback information on the play legitimacy.

In an aspect of the present invention, the network communication unit 101 of the game data providing server 100 may transmit the game data and multimedia information including the information of the player to the client device 200. Furthermore, the network communication unit 101 may transmit the game data and multimedia information to a predetermined server other than the client device 200. For example, the network communication unit 101 may transmit the game data and multimedia information to a world dart contest server, etc. Additionally, the network communication unit 101 may transmit information in addition to the game data and the multimedia information to the client device 200.

Figure 4A:
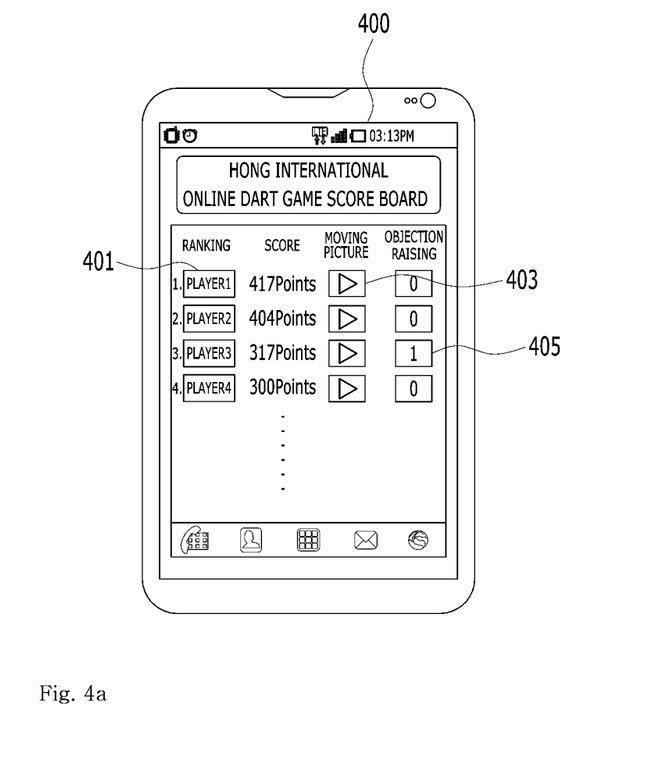
FIGS. 4a, 4b, and 4c illustrate one screen of a user interface for a game result confirmation page which may be displayed in the client device according to the embodiment of the present invention.

In an aspect of the present invention, the network communication unit 101 may transmit an objection raising request message of the player to the second client device 200b (see FIG. 4A). That is, the network communication unit 101 may transmit, for example, a response message (for example, a referee confirmation request message) to the object request of the player to the second client device 200b. Further, the network communication unit 101 may distribute an application including a user interface related to the dart game to the client device 200.

According to an embodiment of the present invention, the game data providing server 100 may include the control unit 103. The control unit 103 may control all operations of the game data providing server 100.

According to an embodiment of the present invention, the control unit 103 may process the game data based on the feedback information on the play legitimacy received from the second client device 200b (FIG. 1). The game data processing method described herein has been described above with reference to FIG. 1, and therefore, the description thereof will be omitted.

According to an additional aspect of the present invention, the control unit 103 may extract one or more pieces of information from the player information. The control unit 103 may calculate the ranking of the dart game based on the extracted one or more pieces of information. For example, the control unit 103 may calculate the dart game ranking based on the player information (e.g., game score, maximum combo information, maximum successive winning information, etc.). In addition, when the score of the game is the same among the dart game data, the control unit 103 may designate the ranking of a player having a lower level as a higher ranking. Such a ranking calculation criterion may be determined by factors such as the ranking, the level, the combo, proximity of hit dart pins, and delay time and the ranking may not be designed only to the aforementioned factors. In addition, the ranking designation calculation criterion may be determined by factors other than the aforementioned factors. Further, the aforementioned dart game ranking calculating method may be performed in the dart game device.

In an additional aspect of the present invention, the control unit 103 may generate motion feedback information based on the received multimedia information of the player. Further, the control unit 103 may store the generated motion feedback information in the database unit 105. Additionally, the control unit 103 may analyze the multimedia information (e.g., a projection posture, a dart pin throwing trajectory, a hit position of the dart pin, etc.) of the player received from the dart game device 300 and store the analyzed information in the database unit 105. Additionally, the motion feedback information generated by the control unit 103 may be transmitted from the network communication unit 101 to the first client device 200a. Further, the control unit 103 may calculate comparison data based on the motion feedback information stored in the database unit 105. For example, the control unit 103 may compare the previous motion feedback information with the current motion feedback information to digitize the dart game data of the players. For example, the control unit 103 may generate the motion feedback information as graph type data and transmit the generated data to the first client device 200a through the network communication unit 101. Herein, the reason why the motion feedback information is provided to the player is to provide the player with a reward to enhance a dart game ability through analysis of the multimedia information captured by the dart game device 300.

In an aspect of the present invention, the database unit 105 may store various information required to be provided to the client device 200, and provide the requested information to other components in the game data providing server 100 according to requests of the other components in the game data providing server 100.

In an aspect of the present invention, the database unit 105 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. In an additional aspect of the present invention, the game data providing server 100 may operate in connection with a web storage performing a storing function of the database unit 105 on the Internet.

Various exemplary embodiments described in the present specification may be implemented in a computer-readable recording medium or storage medium or a recording medium or storage medium readable by a device similar to the computer by using, for example, software, hardware, or a combination thereof.

For example, according to hardware implementation, the exemplary embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the micro-controllers, the microprocessors, and the electric units for performing other functions. In some cases, the embodiments described in the specification may be implemented by the control unit 103 itself.

As another example, according to software implementation, exemplary embodiments such as a procedure and a function described in the specification may be implemented by separate software modules. Each of the software modules may perform one or more functions and operations described in the specification. A software code may be implemented by a software application written by an appropriate program language. The software code may be stored in the database unit 105 and executed by the control unit 103.

Figure 3:
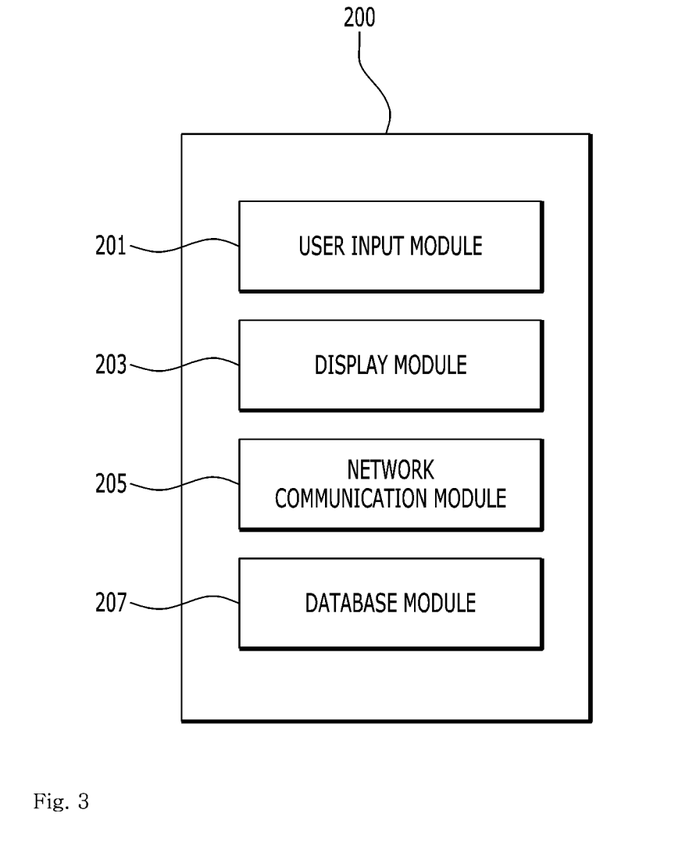
FIG. 3 illustrates components of the client device according to the embodiment of the present invention.

FIG. 3 illustrates components of the client device according to the embodiment of the present invention.

According to an aspect of the present invention, the client device 200 may include a user input module 201, a display module 203, a network communication module 205, and a database module 207.

Components constituting the client device 200 illustrated in FIG. 3 are exemplary and only some of the components may constitute the client device 200 or an additional component(s) may be included in the client device 200 in addition to the components. As described above, the client device 200 may be constituted by the first client device 200a (the device used by the player) and the second client device 200b (the device used by the referee) and further, the second client device 200b may perform functions other than the functions of the components described later. For example, the second client device 200b may control the dart game device 300 by performing remote control. In this case, the second client device 200b may further include a motion control module.

According to an embodiment of the present invention, the user input module 201 may receive an input of the objection raising request from the player. Additionally, the user input module 201 of the second client device 200b may receive an input of the determination result. Further, the user input module 201 may receive an input for selecting the player information. For example, the user input module 201 may receive an input for selecting one player from the player list. In this case, the client device 200 can output the dart game data for the one player through the display module 203 (see FIG. 4b).

According to an embodiment of the present invention, the display module 203 may display a game result confirmation page including a request icon for requesting the player information, the game data of the player, and the multimedia information related to the game data of the payer. Contents of the game result confirmation page to be described below will be described later in FIG. 4.

According to an aspect of the present invention, the display module 203 may output a scene captured by the dart game device 300. Further, the display module 203 may be configured by a liquid crystal screen. Accordingly, the client device 200 may output the game result confirmation page including the player information, the game information, the multimedia information, the object request information, and the determination result information on the liquid crystal screen (see FIG. 4a). In addition, the display module 203 does not output only the aforementioned information, and may output even various predetermined information included in the game result confirmation page.

According to an embodiment of the present invention, the display module 203 may be formed as a touch screen. In this case, the display module 203 may be included in the user input module 101.

According to an embodiment of the present invention, the client device 200 may include the network communication module 205. The network communication module 205 may collect and/or receive the information (e.g., dart game data and multimedia information) related to the dart game from the game data providing server 100 through the network 199. The network communication module 205 may collect or receive big data such as information on a plurality of players from an external server. Additionally, the network communication module 205 may receive the feedback information on the play legitimacy from the game data providing server 100 (see FIG. 4c). Further, the network communication module 205 may receive the application including the user interface related to the corresponding dart game from an external server other than the dart game cheating determining server. For example, the network communication module 205 may receive the application related to the corresponding dart game from a dart game company.

According to an embodiment of the present invention, the client device 200 may include the network communication module 205. The network communication module 205 may transmit the objection raising request information input from the player by the user input module 201 to the game data providing server 100. Additionally, the network communication module 205 may transmit the determination result information examined by the second client device 200b to the game data providing server 100.

When the aforementioned contents are summarized and described, since a subject using the client device 200 may include the referee and the player, it is possible to receive and transmit the objection raising request and the determination result from and to the game data providing server 100 through the network 199 to control the components through a control module (not illustrated).

Although not illustrated, the control module (not shown) may control all operations of the client device 200. The control module (not illustrated) may store data received and collected by the network communication module 205 in the database module 207.

In an aspect of the present invention, the database module 207 may store various information required to be provided to the game data providing server 100 and/or a predetermined server and provide the received information to the client devices 200 according to requests of the client devices 200.

In an aspect of the present invention, the database module 207 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Further, the database module 207 may be formed as a predetermined type different from the aforementioned memory type.

As another example, each of the software modules may perform one or more functions and operations described in the specification. A software code may be implemented by a software application written by an appropriate program language. The software code may be stored in the database unit 207 and executed by the control module (not illustrated). Additionally, the components included in the client device 200 may execute various functions in addition to the aforementioned function.

Figure 4B:
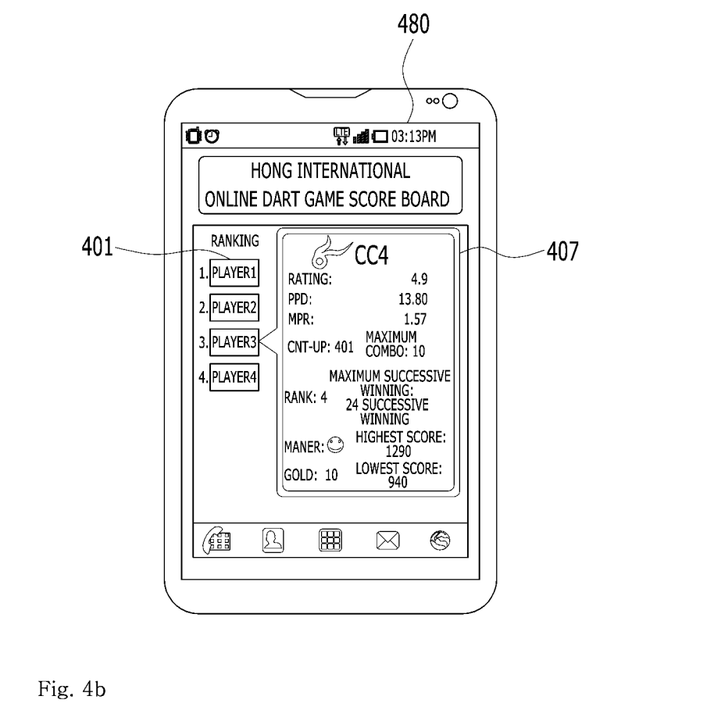
Figure 4C:
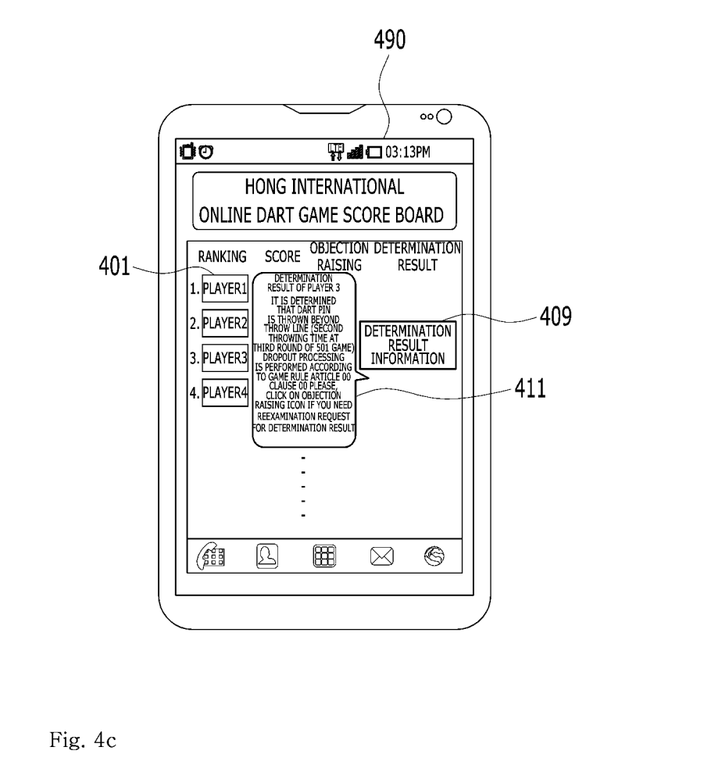

FIGS. 4a, 4b, and 4c illustrate one screen of a user interface for a game result confirmation page which may be displayed in the client device according to the embodiment of the present invention.

FIGS. 4a, 4b, and 4c illustrate screens 400, 480, and 490 of the user interface which may be output by the client device 200 and are not limited to the illustrated screens and a predetermined another screen may also been included in the scope of the present invention.

As illustrated in FIGS. 4a, 4b, and 4c, the client device 200 may be implemented as a smart app that may easily retrieve the user interface. In addition, the smart apps may be shared with acquaintances through interactions with SNS such as KakaoTalk, Facebook, Twitter, etc. Further, the client device 200 includes a computer capable of performing wireless and wired communication and user interface screens 400, 480, and 490 implemented as a webpage may be output. Additionally, the user interface screens 400, 480, and 490 of FIGS. 4a, 4b, and 4c may also be output from the dart game device 300. Further, the screen output from the dart game device 300 may be the same as or different from the screens illustrated in FIGS. 4a, 4b, and 4c.

According to an embodiment of the present invention, game data request icon 401 including player information, a multimedia information request icon 403, an objection raising request icon 405, a determination result input icon 409, and the like may be disposed on one user interface screen 400. The game data and icons are illustrated according to an embodiment of the present invention and various data and icons may be arranged. "User interface screens 400, 480, and 490" which need to be described below are replaced with "user screens 400, 480, and 490".

According to an embodiment of the present invention, the display module 203 of the client device 200 may display a game result confirmation page including a ranking list of a predetermined ranking or more among the ranking lists of the players. For example, the client device 200 may output an upper or lower ranking list based on a predetermined ranking (e.g., 100-th place). Further, the upper or lower ranking list may be determined in a predetermined unit. For example, the predetermined unit may be determined to be 50. Additionally, the client device 200 may display an upper or lower ranking list including the ranking of the player who plays the dart game. For example, the display module 203 may display the upper or lower ranking list based on the ranking (for example, 97-th place) of the corresponding player. Further, the upper and/or lower ranking list may be displayed in a predetermined unit as described above. That is, the display module 203 can display 25 upper players and 25 lower players based on the 97-th place. The reason why the ranking list is displayed on the display module 203 is that the ranking of the player may be increased by judging whether the play of the top player is legitimate. For example, the player may detect five cheating players by confirming the multimedia information of the top players among the displayed ranking lists. In such a case, the ranking of the corresponding player may increase by 5 levels. Further, when the dart game contest is a tournament, the player checks the multimedia information of other players to plan to advance to a next round. For example, when the player advances to the 16-th round of the tournament contest, the multimedia information of the 32-nd round players to be connected in the 16-th round may be confirmed. Herein, when cheating on two players among the 32-nd players who will be connected in the 16-th round is detected, there may be a case where the corresponding player will advance to the 8-th round by default.

As illustrated in FIG. 4*b*, the client device 200 may output game data 407 including the information of the corresponding player when the input for selecting the player information request icon 401 is received. The display module 203 may display the game data 407 including the player information by outputting a new page such as a window, a speech balloon, or the like. Additionally, the client device 200 may output the game data 407 including the score of the player, which includes RATING (i.e., a unit to divide a rating according to dart score distribution), PPD (i.e., as an average score value of one dart, used in games marked with the score, including 01 game, count-up, and the like), PPR (i.e., as the average score value of three darts, used in games marked with the score, including 01 game, count-up, and the like), MPD (i.e., as an average mark value of one dart, used in a cricket), MPR (i.e., as the average mark value of three darts, used in the cricket), and the like. Further, as described in FIG. 1, the client device 200 may output scores, nicknames, total ranking, level, maximum combo information, maximum successive winning information, and lowest score information of the game in which the player participates. The reason for checking the game information of the player as such is to objectively determine the ability of the player.

In an aspect of the present invention, the client device 200 may play multimedia when receiving an input for selecting the multimedia information request icon 403 shown in FIG. 4*a*. Herein, the multimedia may include all the contents for a moving picture, an image, a voice, and the like, and a moving picture icon of the game result confirmation page illustrated in FIG. 4*a* is illustrated for the sake of understanding of the present invention. The icons described herein means an input selection unit including tabs, buttons, and windows. For example, the multimedia information request icon 403 on one screen of the client device 200 may include a tab for playing the multimedia, so that when the selection of the tab is received, related multimedia may be checked. In addition, the client device 200 may receive a user input to select the related multimedia and play the multimedia. The aforementioned multimedia playing method is just an exemplary method according to an embodiment of the present invention and may adopt various methods. Furthermore, a multimedia screen will be described later in FIG. 5.

In an additional aspect of the present invention, the game data providing server 100 may generate a play indication on the multimedia information request icon 403. Additionally, the play indication may be generated at any of the upper, lower, left, and right sides in the multimedia information request icon 403. In addition, when the client device 200 receives the input for selecting the multimedia information request icon 403 from the player and the referee, the client device 200 may play the multimedia in real time. Further, the game data providing server 100 may generate a window to play the multimedia in real time. The moving picture screen played herein will be described later in FIG. 5.

Additionally, the game data providing server 100 may transmit the game data and the multimedia information to the second client device 200*b* when the input for the player to select the objection raising request icon 405 is received a predetermined number of times or more. The number of times described herein may include one or more times. Alternatively, the object request icon 405 of the second client device 200*b* used by the referee is marked so that the selected player list is distinguished from the other player list (FIG. 1) or a notification sound may be output to the client device 200. In this case, the referee may select the moving picture icon of the displayed player list and view the moving picture.

As illustrated in FIG. 4C, the second client device 200*b* may receive the input for the determination result information from the referee. Further, the user screen 490 illustrated in FIG. 4*c* may be output even from the first client device 200*a*. This is to allow the player corresponding to the game data and the multimedia information to check the determination result. When the contents of the determination result information described in FIG. 1 are additionally described, a penalty imposing step may be applied based on a game rule. For example, the step may be divided into step 1—General throwing action, step 2—Warning, step 3—Replay, step 4—Dropout, step 5—Dropout and reward disqualification, step 6—Dropout and no competition during predetermined period and the predetermined number of times, and step 7—permanent removal. At this time, the referee determines the determination result adopting each step to proceed to process the determination result in the game data providing server 100. In this case, the referee may transmit the determination result information (for example, foul for throw line X times, violation of game rule article 00 clause 00, application of third steps, etc.) to the game data providing server 100. Further, the referee may transmit only the determination result information to the game data providing server 100 and the game data providing server 100 may proceed to process the determination of the determination result. In this case, the referee may transmit the determination result information (for example, foul for throw line X times, violation of game rule article 00 clause 00, etc.) to the game data providing server 100. Additionally, a message of the determination result information (e.g., "it is determined that the dart pin is thrown beyond the throw line", "second throwing time at third round of 501 game", "Dropout processing is performed according to game rule article 00 clause 00", "Please, click on the objection raising icon if you need a reexamination request for the determination result", etc.) may be transmitted to the first client device.

According to an additional embodiment of the present invention, the objection raising request icon 405 received by the game data providing server 100 may be used even by the player corresponding to the feedback information on the play legitimacy. That is, the corresponding player may input information about the re-examination request for the determination result by selecting the objection raising request icon. Additionally, when the object request icon is selected, a page may be created to enter the information about the re-examination request. Furthermore, when the re-examination request is performed, steps 177 and 179 may be additionally performed.

According to an embodiment of the present invention, the game data providing server 100 may transmit to the client device 200 the ranking list in which the rankings of the players are modified based on the received determination result information. In this case, the client device 200 updates the modified ranking list to display the modified ranking list on the display module 203. For example, the client device 200 may display the ranking list on the display module 203 excluding the players that drop out based on the determination result. Alternatively, the revived player may be displayed while being in the ranking list based on the determination result information. Additionally, a player with a pre-cheating record may be marked on the ranking list with a different marking from the other players.

Figure 5:
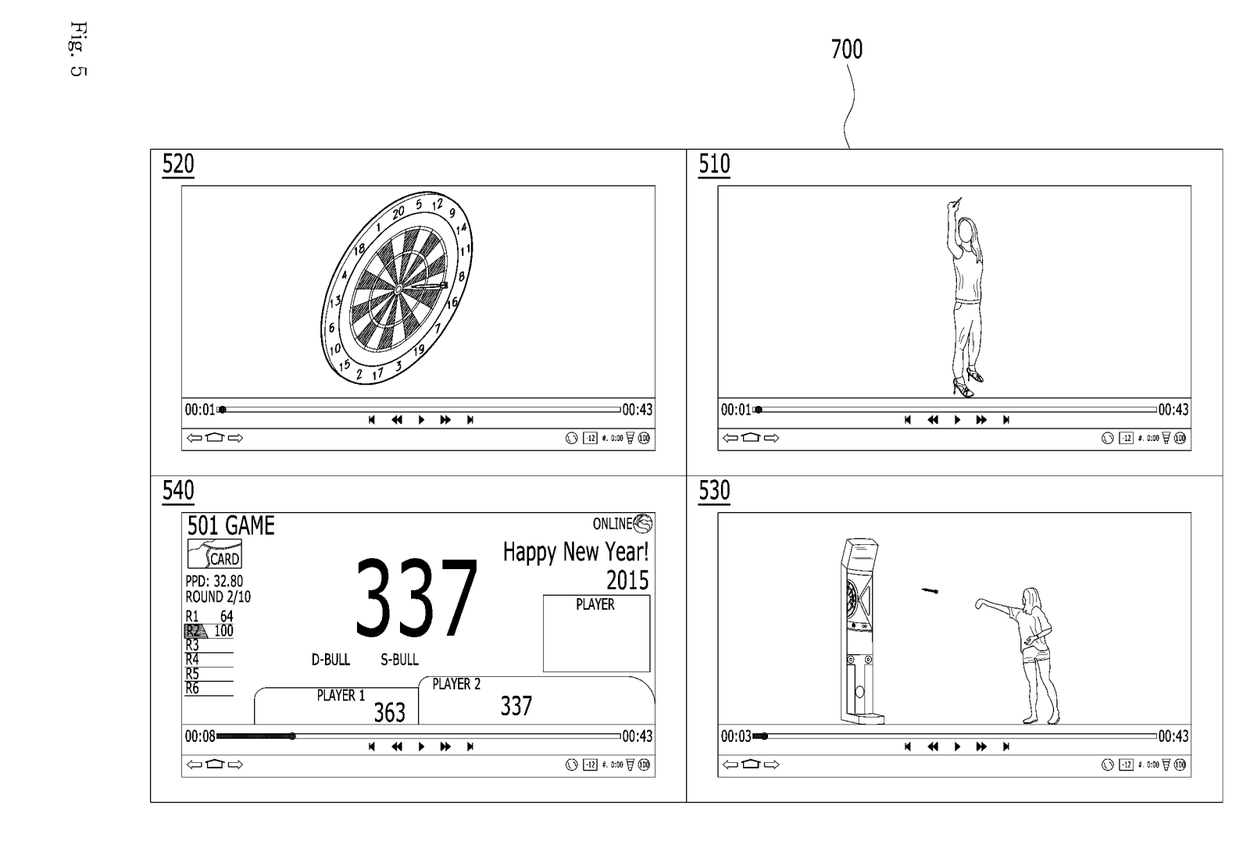
FIG. 5 illustrates one screen for multimedia information which may be output from the client device according to the embodiment of the present invention.

FIG. 5 illustrates one screen for multimedia information which may be output from the client device according to the embodiment of the present invention.

Since a screen (that is, a first scene 510, a second scene 520, a third scene 530, and a score confirmation screen 540) 500 illustrated in FIG. 5 is just an example according to an aspect of the present invention, it will be apparent to those skilled in the art that screens having other shapes or variables having different values may also be included in the scope of the present invention. Further, although not illustrated in FIG. 5, additional variables, information, and combinations thereof may also be included in the scope of the present invention.

Additionally, the multimedia information includes moving pictures, images, and sounds, and the multimedia information to be described below is expressed as the moving picture in order to facilitate understanding of the present invention.

In an embodiment of the present invention, the dart game device 300 may capture a moment when the player performs a throwing operation on the throwing line to the moment when the dart pin is hit on the dart target. In this case, although not illustrated in FIG. 5, a button and a sensor may be installed on the throw line. For example, when the player presses the button on a foot or is sensed by the sensor, capturing may start in a camera portion of the dart game device 300.

Additionally, the dart game device 300 may cut the captured moving picture from the moment when the dart pin is hit on the dart target to a predetermined previous time. For example, when the dart pin is hit by a dart target, the dart game device 300 may cut a moving picture captured up to three seconds before and store the cut moving picture in the memory. The predetermined time described herein may be designated as units of seconds and minutes. Additionally, the dart game device 300 may capture the entire dart game play. In this case, the dart game device 300 may store the entire moving picture in the memory 180.

According to an embodiment of the present invention, the client device 200 may output the moving picture. In addition, the client device 200 may divide at least two moving pictures and output the moving pictures on one screen. Additionally, the client device 200 may output only one moving picture on one screen. Further, the divided screen and one screen may be output based on the selection input of the user. Furthermore, a screen order illustrated in FIG. 5 is not a fixed form, and a screen combined in various orders may be output from the client device 200.

In one aspect of the present invention, the first scene 510 may be output to the client device 200, in which the time when the player throws the dart pin is captured. Further, the first scene 510 may be an image video captured from the front side of the player and may be a moving picture in which a dart pin throwing position and a dart pin throwing posture of the player are captured. Further, the first scene 510 may be a moving picture in which the throw line is captured. Furthermore, the reason why the first scene 510 is captured is to check the cheating of the player who throws the dart pin. For example, the first scene 510 may be a moving picture captured to check whether the player throws the dart pin beyond the throw line. Further, the first scene 510 may be captured to check whether the player does not exceed the throw line at the moment when the player throws the dart pin and exceeds the throw line after throwing the dart pin without exceeding the throw line. The first scene 510 may be a moving picture captured to check a situation other than the above-mentioned cheating (that is, confirmation of the identity of the player, confirmation of an agent, use of the dart pin throwing device, etc.).

Additionally, the second scene 520 in which the dart pin is hit on the dart target may be output to the client device 200. The reason why the second scene 520 is captured is to determine the position where the dart pin is hit and a measured score. For example, the second scene 520 may be used as data for examining a case where the dart pin is hit but the score is not calculated, a case where the dart pin is not hit but the scores are calculated, a case where the hit position of the dart pin and the score do not coincide with each other, and the like. Further, the second scene 520 may be used as data for examining errors that may occur in the dart pins and dart targets other than the cases.

Additionally, the third scene 530 in which the dart pin thrown by the player is hit on the dart target may be output to the client device 200. Furthermore, the reason why the third scene 530 is captured is to capture a blind spot that may be missed in the first scene 510 and the second scene 520. For example, in the third scene 530, it may be checked whether any user throws the dart pin in the blind spot that is not captured in the first scene 510 and the second scene 520. Further, the third scene 530 may be used as data for examining whether the dart pin thrown by the player is hit on the dart target.

Additionally, the score confirmation screen 540 may be output to the client device 200. This is to check whether the score corresponding to the position where the dart pin is hit is calculated in the first scene 510. Further, the player information may be output while being included in the score confirmation screen 540 output to the client device 200. For example, the image of the player may be output to the client device 200. In this case, the referee who confirms the screen of the client device 200 compares the images of the player with the players of the second scene 520 and the third scene 530 to check whether the same person plays the game.

In an additional aspect of the present invention, the dart game cheating determination server 200 may down-sample an image quality of the moving picture received from the dart game device 300 at a predetermined rate. The down sampling described herein refers to a function of generating the moving picture by reducing a resolution of the moving picture. Additionally, the dart game cheating determination server 200 may select and down-sample one of the methods of average downsampling, bicubic downsampling, and sub-sampling. Further, the down sampling method may be executed in a server and a device other than the dart game cheating determination server 200. The reason why the down sampling is executed is to store a large number of moving pictures in the dart game cheating determination server 200.

In one or more exemplary implementations, the functions presented herein may be implemented through hardware, software, firmware, or a combination thereof. When the functions are implemented by the software, the functions may be stored in a computer-readable medium as one or more commands or codes or transmitted therethrough. The computer-readable medium includes a computer storage medium and a communication medium including a predetermined medium for easily transferring a computer program from one place to another place. The storage medium may be a predetermined available medium which may be accessed by a universal computer or a special-purpose computer. For example, the computer-readable medium includes a RAM, a ROM, an EEPROM, a CD-ROM, or other optical disk storage medium, a magnetic disk storage media, or other magnetic storage devices or predetermined other media which may be used to store program code means required as a form of a command or data structure and accessed by a universal computer, a special-purpose computer, a universal processor, or a special processor, but is not limited thereto. Further, predetermine connection means may be regarded as the computer-readable medium. For example, when software is transmitted from a website, a server, or another remote source through wireless technologies such as a coaxial cable, an optical fiber cable, a flexible wire, a digital subscriber line (DSL), or infrared radio, and microwaves, the wireless technologies such as the coaxial cable, the optical fiber cable, the flexible wire, the DSL, or infrared radio, and the microwaves may be included in definition of the medium. Disk and disc used herein include a compact disc (CD), a laser disc, an optical disc, a DVD, a floppy disk, a Blu-ray disc and herein the disk magnetically reproduces data, while the disc optically reproduces data through a laser. The combinations may also be included in the range of the computer-readable medium.

It will be well appreciated by those skilled in the art that various exemplary elements, components, logic blocks, modules, and algorithm steps may be implemented by electronic hardware, computer software, or a combination thereof. In order to clarify mutual compatibility of hardware and software, various exemplary elements, blocks, modules, and steps are described in functional viewpoints thereof. Whether such a function is implemented by the hardware or the software depends on design limitations given to a specific application and an entire system. Those skilled in the art may implement the functions by various methods with respect to respective specific applications, but the implementation determination does not depart from the scope of the present invention.

Various exemplary logic blocks and modules disclosed in association with the disclosure may be implemented or performed through a universal processor, a digital signal processor (DSP), an application specific integrated circuit (ASIC), a field programmable gate array (FPGA), or other programmable logic device, discrete gate or transistor logic, discrete hardware components, or a predetermined combination designed to implement the functions disclosed herein. The universal processor may be the microprocessor, and in an alternative embodiment, the universal processor may be a conventional processor, controller, microcontroller, or state machine. The processor may be implemented as, for example, combinations of calculation devices such as the DSP and the microprocessor, a plurality of microprocessors, one or more microprocessors coupled with a DSP core, or a combination of the components.

In respect to hardware implementation, various exemplary logics, logic blocks, and modules of processing units described in association with aspects disclosed herein may be implemented in one or more ASICs, DSPs, digital signal processing devices (DSPDs), programmable logic devices (PLDs), field programmable gate arrays (FPGAs), discrete gate or transistor logic, discrete hardware components, universal-purpose processors, controllers, micro-controllers, microprocessors, other electronic units designed to perform the functions described herein, or a combination thereof. The universal-purpose processor may be the microprocessor, and alternatively, the universal-purpose processor may be a predetermined conventional processor, controller, microcontroller, or state machine. The processor may also be implemented as combinations of computing devices (for example, combinations of the DSP and the microprocessor, the plurality of microprocessors, and one or more microprocessors connected with the DSP core, or a predetermined other appropriate configuration). Additionally, at least one processor may include one or more modules which may implement one or more steps and/or operations among the steps and/or operations described herein.

Moreover, various aspects or features described herein can be implemented as methods, apparatuses, or manufactured articles using standard programming and/or engineering techniques. Steps and/or operations of a method or algorithm described in association with the aspects disclosed herein can be directly implemented as hardware or as a software module executed by a processor, or a combination thereof. Additionally, in some aspects, the steps or operations of the method or algorithm can be present as at least one or predetermined combination of sets of codes or commands on a machine-readable or computer-readable medium and this can be integrated into a computer program article. The terms manufactured article as used herein is intended to include a computer program accessible by a predetermined appropriate computer-readable device or medium. The description of the presented exemplary embodiments is provided so that those skilled in the art of the present invention use or implement the present invention. Various modifications of the exemplary embodiments will be apparent to those skilled in the art and general principles defined herein can be applied to other exemplary embodiments without departing from the scope of the present invention. Therefore, the present invention is not limited to the exemplary embodiments presented herein, but should be analyzed within the widest range which is coherent with the principles and new features presented herein.

MODE FOR INVENTION

Related contents in the best mode for carrying out the present invention are described.

INDUSTRIAL APPLICABILITY

The present invention may be used in a digital device, a dart device, a dart game device, an entertainment device, a dart server, and the like.

The invention claimed is:

1. A method for determining cheating in a dart game, the method comprising:
    collecting game data and multimedia information of a player from a dart game device, wherein the multimedia information includes video information captured from the moment when the player makes a throwing motion in a throw line up to the moment when a dart pin hits a dart target;
    transmitting the collected game data and multimedia information which includes a second scene and a third scene to a client device, wherein the second scene is a scene that includes capturing of the hit of the dart pin to the dart target to receive feedback from the client device about whether a score matches a position where the dart pin hit, and wherein the third scene is a scene that includes capturing of an area other than the player and the dart target to receive feedback from the client device about whether a person other than the player throws the dart pin;
    receiving feedback information on legitimacy of play with respect to the multimedia information from the client device; and
    processing the game data of the player corresponding to the multimedia information on the basis of the received feedback information related to legitimacy of play.

2. The method for determining cheating in a dart game of claim 1, wherein the client device includes
    a first client device used by the player, and
    a second client device used by a referee.

3. The method for determining cheating in a dart game of claim 2, wherein the receiving of the feedback information on legitimacy of play includes
    receiving object request information from the first client device,
    transmitting game data and multimedia data corresponding to the object request information to the second client device, and
    receiving determination result information corresponding to the game data and the multimedia information from the second client device.

4. The method for determining cheating in a dart game of claim 1, wherein the processing of the game data includes determining whether the player conducts the cheating based on the received feedback information on legitimacy of play.

5. The method for determining cheating in a dart game of claim 4, wherein the determining of whether the player conducts the cheating includes deciding penalty information to be imposed on the player determined to have conducted the cheating.

6. The method for determining cheating in a dart game of claim 1, wherein the processing of the game data of the player includes marking the game data and the multimedia information of the player, which correspond to the received feedback information related to legitimacy of play to be distinguished from game data and multimedia information of another player.

7. The method for determining cheating in a dart game of claim 1, wherein the game data includes at least one of a score of a game in which the player participates, an entire ranking, level, maximum combo information, maximum successive winning information, highest score information, and lowest score information.

8. A server providing game data collected from one or more dart game devices, comprising:
    a network communication unit collecting game data and multimedia information of a player from a dart game device, transmitting the collected game data and multimedia information which includes a second scene and a third scene to a client device, and receiving feedback information on legitimacy of play with respect to the game data and the multimedia information from the client device, wherein the multimedia information includes video information captured from the moment when the player makes a throwing motion at a throw line up to the moment when a dart pin hits a dart target, wherein the second scene is a scene that includes capturing of the hit of the dart pin to the dart target to receive feedback from the client device about whether a score matches a position where the dart pin hit, and wherein the third scene is a scene that includes capturing of an area other than the player and the dart target to receive feedback from the client device about whether a person other than the player throws the dart pin; and
    a control unit processing the game data of the player corresponding to the multimedia information on the basis of the received feedback information related to legitimacy of play.

9. A client device comprising:
    a user input module receiving an input of feedback information related to legitimacy of play of a user according to game data and multimedia information which includes a second scene and a third scene of a player, wherein the multimedia information includes video information captured from the moment when the player makes a throwing motion at a throw line up to the moment when a dart pin hits a dart target, wherein the second scene is a scene that includes capturing of the hit of the dart pin to the dart target to receive feedback from the client device about whether a score matches a position where the dart pin hit, and wherein the third scene is a scene that includes capturing of an area other than the player and the dart target to receive feedback from the client device about whether a person other than the player throws the dart pin;
    a display module displaying a game result confirmation page including a request icon for requesting the player information, the game data of the player, and multimedia information related with the game data of the player; and
    a network communication module transmitting the input feedback information related to legitimacy of play to a server.

10. The client device of claim 9, wherein the display module displays the game result confirmation page including a ranking list of a predetermined ranking or more among ranking lists of players.

11. The client device of claim 9, wherein the display module displays the game result confirmation page including a ranking list including a ranking of a corresponding player who plays a dart game.

12. The client device of claim 9, wherein the display module displays the game result confirmation page including a ranking list in which rankings of players are modified based on the feedback information related to legitimacy of play.

13. The client device of claim 9, wherein the feedback information related to legitimacy of play includes object request information, and the display module displays the game result confirmation page including an object request icon for the game data and the multimedia information of the player.

14. The client device of claim 9, wherein the feedback information related to legitimacy of play includes determination result information, and the display module displays the game result confirmation page including a determination result input icon for the game data and the multimedia information of the player.

15. The method of claim 1, further comprising:
- detecting when the player is making the throwing motion using a sensor that is configured to generate a signal; and
- wherein the step of collecting game data and multimedia information of the player begins when the signal is received from the sensor indicating the player is making the throwing motion and ends when the dart pin hits the dart target.

* * * * *